(12) United States Patent
Kim et al.

(10) Patent No.: US 12,715,266 B2
(45) Date of Patent: Aug. 25, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Jeawan Kim, Hwaseong-si (KR); Hochan An, Hwaseong-si (KR); Yeonho Kim, Seoul (KR); Hoyoung Jeong, Hwaseong-si (KR); Man Hee Park, Suwon-si (KR); Yeong Jun Kim, Incheon (KR); Jae Yeon Kim, Hwaseong-si (KR); Gwi Taek Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 276 days.

(21) Appl. No.: 18/657,508

(22) Filed: May 7, 2024

(65) Prior Publication Data

US 2025/0153538 A1 May 15, 2025

(30) Foreign Application Priority Data

Nov. 10, 2023 (KR) ........................ 10-2023-0155331

(51) Int. Cl.
*B60H 1/00* (2006.01)

(52) U.S. Cl.
CPC ..... *B60H 1/00885* (2013.01); *B60H 1/00278* (2013.01); *B60H 2001/00307* (2013.01); *B60H 1/00907* (2013.01); *B60H 2001/00928* (2013.01)

(58) Field of Classification Search
CPC ............ B60H 1/00885; B60H 1/00907; B60H 1/00278; B60H 2001/00307; B60H 2001/0092
See application file for complete search history.

(56) References Cited

U.S. PATENT DOCUMENTS

| | | | | |
|---|---|---|---|---|
| 9,441,865 | B2 | 9/2016 | Inaba | |
| 10,661,631 | B2 | 5/2020 | Kawano | |
| 12,508,873 | B2 * | 12/2025 | Cho | B60H 1/00278 |
| 2013/0312447 | A1 | 11/2013 | Inaba | |
| 2016/0339767 | A1 * | 11/2016 | Enomoto | B60H 1/3207 |
| 2019/0366800 | A1 * | 12/2019 | Durrani | B60H 1/00907 |
| 2020/0180391 | A1 * | 6/2020 | Kim | B60H 1/00278 |
| 2020/0369108 | A1 * | 11/2020 | Kim | B60H 1/32284 |
| 2021/0061067 | A1 * | 3/2021 | Kim | B60H 1/3213 |
| 2022/0088990 | A1 * | 3/2022 | Kim | B60H 1/00278 |

FOREIGN PATENT DOCUMENTS

| | | | |
|---|---|---|---|
| KR | 101558314 | B1 | 10/2015 |
| KR | 20200040432 | A | 4/2020 |

* cited by examiner

*Primary Examiner* — Joel M Attey
(74) *Attorney, Agent, or Firm* — Lempia Summerfield Katz LLC

(57) ABSTRACT

A heat pump system for a vehicle may include: a compressor, a heating, ventilation, and air conditioning (HVAC) module, a heat-exchanger, a first expansion valve, a connection line, and a chiller. The heat pump system may improve heating performance for heating a vehicle interior by employing a gas injection device selectively operating at the time of heating a vehicle interior to increase the flow amount of refrigerant.

19 Claims, 6 Drawing Sheets

50
14
12
12a
12b
11
32
31
34
11
11
30
33
15
10
36
11
16
11
11
102
23
21
112
21
35
11
114
20
104
11
13a
13
11

50
14
12
12a
12b
11
32
31
34
30
33
15
10
36
16
102
23
21
112
114
20
104
35
13a
13

50
14
12
12a
12b
11
32
31
34
30
33
15
10
36
16
11
102
23
21
112
35
114
20
104
13a
13

50
14
12
12a
12b
11
15
10
16
36
32
31
34
30
33
35
102
112
114
104
20
21
23
13
13a

HEAT PUMP SYSTEM FOR A VEHICLE

CROSS-REFERENCE TO RELATED APPLICATION

This application claims priority to and the benefit of Korean Patent Application No. 10-2023-0155331 filed in the Korean Intellectual Property Office on Nov. 10, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle capable of improving heating performance by employing a gas injection device selectively operating at the time of heating a vehicle interior.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increase in interest in energy efficiency and environmental pollution, the development of an environmentally-friendly vehicle capable of substantially substituting for an internal combustion engine vehicle is desired. The environmentally-friendly vehicles are classified into electric vehicles driven using a fuel cell or electricity as a power source and hybrid vehicles driven using an engine and a battery.

Among these environmentally-friendly vehicles, a separate heater is not used unlike an air conditioner of a general vehicle. Additionally, an air conditioner used in the environmentally-friendly vehicle is generally called a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is desired to secure performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation of the motor, an electric component, and the battery including a fuel cell.

Therefore, the size and weight of a cooling module disposed at the front of the vehicle are increased, and a layout of connection pipes supplying a refrigerant and a coolant to each of the heat pump system, the cooling means, and the battery cooling system in an engine compartment becomes complicated. In addition, since a battery cooling system for heating or cooling the battery according to a state of the vehicle is separately provided to obtain optimal performance of the battery, a plurality of valves for selectively interconnecting connections pipes are employed. Thus, noise and vibration due to frequent opening and closing operations of the valves may be introduced into the vehicle interior, thereby deteriorating the ride comfort.

In addition, when heating the vehicle interior, the heating performance may deteriorate due to the lack of a heat source, the electricity consumption may be increased due to the usage of the electric heater, and the power consumption of the compressor may be increased.

The above information disclosed in this Background section is only to enhance understanding of the background of the disclosure. Therefore, the Background section may contain information that does not form the prior art that is already known to a person of ordinary skill in the art.

SUMMARY

The present disclosure provides, a heat pump system for a vehicle capable of improving the heating performance by employing a gas injection device selectively operating at the time of heating a vehicle interior to increase the flow amount of the refrigerant.

A heat pump system for a vehicle may include: a compressor configured to compress a refrigerant; and a heating, ventilation, and air conditioning (HVAC) module internally provided with an internal condenser, an evaporator connected to the compressor via a refrigerant line, and an opening/closing door configured to adjust the ambient air having passed through the evaporator to selectively flow into the internal condenser based on a cooling or heating mode of a vehicle interior. The heat pump system may also include a heat-exchanger connected to the internal condenser via the refrigerant line and may be configured to condense or evaporate the refrigerant by exchanging heat between the refrigerant supplied from the internal condenser and air. Additionally, the heat pump system may include: a first expansion valve connected to the heat-exchanger via the refrigerant line; a connection line having a first end connected to the refrigerant line between the heat-exchanger and the first expansion valve and a second end connected to the refrigerant line between the heat-exchanger and the evaporator; a chiller provided on the connection line and configured to adjust a temperature of the coolant by exchanging heat between the refrigerant introduced into the connection line and a coolant that is selectively introduced; and a second expansion valve provided on the connection line at an upstream end of the chiller. The heat pump system may also include a gas injection device connected to the refrigerant line between the internal condenser and the heat-exchanger. The gas injection device may be configured to: selectively expand and flow the refrigerant supplied from the internal condenser; selectively supply a partial refrigerant among the supplied refrigerant to the compressor; and increase a flow amount of the refrigerant circulating the refrigerant line. A flow of the refrigerant is controlled based on at least one mode for a temperature adjustment of the vehicle interior.

The gas injection device may include a gas-liquid separator provided on the refrigerant line between the internal condenser and the heat-exchanger and configured to separate and selectively discharge a gaseous refrigerant and a liquid refrigerant among the supplied refrigerant. The gas injection device may also include a third expansion valve provided on the refrigerant line between the internal condenser and the gas-liquid separator and may include a fourth expansion valve provided on the refrigerant line between the gas-liquid separator and the heat-exchanger. The gas injection device may also include a first line having a first end connected to the third expansion valve and a second end connected to the refrigerant line between the gas-liquid separator and the fourth expansion valve and may include a second line having a first end connected to the second expansion valve and a second end connected to the refrigerant line between the gas-liquid separator and the fourth expansion valve. The gas injection device may also include a supply line having a first end connected to the gas-liquid separator and a second end connected to the compressor.

The third expansion valve may be configured to selectively expand the refrigerant supplied from the internal condenser and supply the expanded refrigerant to the gas-liquid separator or to selectively expand the refrigerant supplied from the internal condenser. The third expansion valve may also be configured to flow the expanded refrigerant into the first line such that the refrigerant may bypass the gas-liquid separator.

A heat pump system for a vehicle may further include a dehumidification line having a first end connected to the fourth expansion valve and a second end connected to the refrigerant line between the first expansion valve and the evaporator.

The fourth expansion valve may be configured to selectively expand the refrigerant supplied from the third expansion valve via the first line or the refrigerant supplied from the gas-liquid separator. The fourth expansion valve may also be configured to supply the refrigerant to one or both of the heat-exchanger and the dehumidification line.

The dehumidification line may be opened by an operation of the fourth expansion valve when dehumidification is included at a time of heating the vehicle interior.

The third expansion valve and the fourth expansion valve may be selectively operated in the at least one mode and may selectively expand the refrigerant supplied to the gas injection device while controlling the flow of the refrigerant.

In a state of heating the vehicle interior, the gas-liquid separator may be operated when the third expansion valve expands and supplies the refrigerant. Additionally, the gas-liquid separator may supply the gaseous refrigerant among the supplied refrigerant to the compressor via the supply line, to increase the flow amount of the refrigerant circulating the refrigerant line.

The second expansion valve, the third expansion valve, and the fourth expansion valve may be 3-way electronic expansion valves configured to selectively expand the refrigerant while controlling the flow of the refrigerant.

The at least one mode may include: a first mode, in which the gas-liquid separator is operated, for recollecting waste heat of an ambient air heat and waste heat of an electrical component while heating the vehicle interior; a second mode, in which the gas-liquid separator is operated, for heating the vehicle interior and recollecting the waste heat of the electrical component; a third mode, in which the gas-liquid separator is not operated, for recollecting the ambient air heat and the waste heat of the electrical component while heating the vehicle interior; a fourth mode, in which the gas-liquid separator is not operated, for recollecting the waste heat of the electrical component while heating the vehicle interior; and a fifth mode, in which the gas-liquid separator is not operated, for cooling a battery module while cooling the vehicle interior.

In the first mode, an operation of the first expansion valve may be stopped. The connection line may be opened by an operation of the second expansion valve. The refrigerant line connecting from a first end of the connection line to the first expansion valve may be closed. A partial refrigerant line connected to an upstream end and a downstream end of the evaporator may be closed. The first line may be closed by an operation of the third expansion valve. The second line may be closed by the operation of the second expansion valve. The supply line may be opened. The second expansion valve may supply the refrigerant introduced via the connection line to the chiller with or without expansion. The third expansion valve may expand the refrigerant introduced via the refrigerant line and may supply the expanded refrigerant to the gas-liquid separator. The fourth expansion valve may expand the refrigerant supplied from the gas-liquid separator and may supply the expanded refrigerant to the heat-exchanger. The gas-liquid separator may supply the gaseous refrigerant among the supplied refrigerant to the compressor via the opened supply line.

In the second mode, an operation of the first expansion valve may be stopped. The refrigerant line connecting the heat-exchanger and the fourth expansion valve may be closed by an operation of the fourth expansion valve. The refrigerant line connecting the heat-exchanger and the first expansion valve may be closed. A partial refrigerant line connected to an upstream end and a downstream end of the evaporator may be closed. A partial connection line connecting from a first end of the connection line to the second expansion valve may be closed. A remaining connection line connecting from a second end of the connection line to the chiller may be opened. The first line may be closed by an operation of the third expansion valve. The second line may be opened by an operation of the second expansion valve. The supply line may be opened. The refrigerant discharged from the gas-liquid separator to the refrigerant line may be supplied to the second expansion valve along the opened second line. The second expansion valve may expand the refrigerant introduced via the second line and may supply the expanded refrigerant to the chiller. The third expansion valve may expand the refrigerant introduced via the refrigerant line and may supply the expanded refrigerant to the gas-liquid separator. The operation of the fourth expansion valve may be stopped and the gas-liquid separator may supply the gaseous refrigerant among the supplied refrigerant to the compressor via the opened supply line.

In the third mode, an operation of the first expansion valve may be stopped. The connection line may be opened by an operation of the second expansion valve. The refrigerant line connecting from a first end of the connection line to the first expansion valve may be closed. A partial refrigerant line connected to an upstream end and a downstream end of the evaporator may be closed. The first line may be opened by an operation of the third expansion valve. A partial refrigerant line connecting the third expansion valve and the gas-liquid separator and a partial refrigerant line connecting a second end of the first line and the gas-liquid separator may be closed. The second line may be closed by the operation of the second expansion valve. The supply line may be closed. The second expansion valve may supply the refrigerant introduced via the connection line to the chiller without expansion. At least one of the third expansion valve and the fourth expansion valve may expand the supplied refrigerant such that the expanded refrigerant may be supplied to the heat-exchanger.

In the fourth mode, an operation of the first expansion valve may be stopped. The refrigerant line connecting the heat-exchanger and the fourth expansion valve may be closed by an operation of the fourth expansion valve. The refrigerant line connecting the heat-exchanger and the first expansion valve may be closed. A partial refrigerant line connected to an upstream end and a downstream end of the evaporator may be closed. A partial connection line connecting from a first end of the connection line to the second expansion valve may be closed. A remaining connection line connecting from a second end of the connection line to the chiller may be opened. The first line may be opened by an operation of the third expansion valve. A partial refrigerant line connecting the third expansion valve and the gas-liquid separator and a partial refrigerant line connecting a second end of the first line and the gas-liquid separator may be closed. The second line may be opened by an operation of the second expansion valve. The supply line may be closed. At least one of the second expansion valve and the third expansion valve may expand the introduced refrigerant such that the expanded refrigerant may be introduced into the chiller and the operation of the fourth expansion valve may be stopped.

In the fifth mode, the refrigerant line connecting the heat-exchanger and the evaporator may be opened by an operation of the first expansion valve. The connection line may be opened by an operation of the second expansion valve. The first line may be opened by an operation of the third expansion valve. A partial refrigerant line connecting the third expansion valve and the gas-liquid separator and a partial refrigerant line connecting a second end of the first line and the gas-liquid separator may be closed. The second line may be closed by the operation of the second expansion valve. The supply line may be closed. The first expansion valve may expand the supplied refrigerant and may supply the expanded refrigerant to the evaporator via the refrigerant line. The second expansion valve may expand the refrigerant supplied via the connection line and may supply the expanded refrigerant to the chiller. The third expansion valve may flow the refrigerant supplied via the refrigerant line to the first line without expansion. The fourth expansion valve may supply the supplied refrigerant to the heat-exchanger without expansion.

The chiller may be connected to an electrical component via a first coolant line where the coolant circulates and may be connected to a battery module via a second coolant line where the coolant circulates.

When recollecting the waste heat of the electrical component, the first coolant line may be opened to connect the chiller and the electrical component.

When cooling the battery module, or when recollecting the waste heat of the battery module, the second coolant line may be opened to connect the chiller and the battery module.

A heat pump system for a vehicle may further include an accumulator provided on the refrigerant line between the evaporator and the compressor.

As described above, according to a heat pump system for a vehicle according to an embodiment, by employing a gas injection device selectively operating at the time of heating a vehicle interior to increase the flow amount of the refrigerant, the heating performance may be improved.

In addition, according to the present disclosure, the waste heat of the electrical component may be recollected by using a chiller where the coolant and the refrigerant exchange heat, and the temperature of the battery module may be adjusted.

In addition, according to the present disclosure, the performance of the system by using the gas injection device may be maximized while minimizing the required components. Accordingly, the system may be advantageously streamlined and simplified.

In addition, according to the present disclosure, the waste heat of the ambient air heat and the electrical component may be selectively recollected to be used for heating the vehicle interior, and accordingly, the heating efficiency may be improved.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, it is possible to reduce manufacturing cost and weight through the simplification of an entire system, and thus improve space utilization.

DETAILED DESCRIPTION

Figure 1:
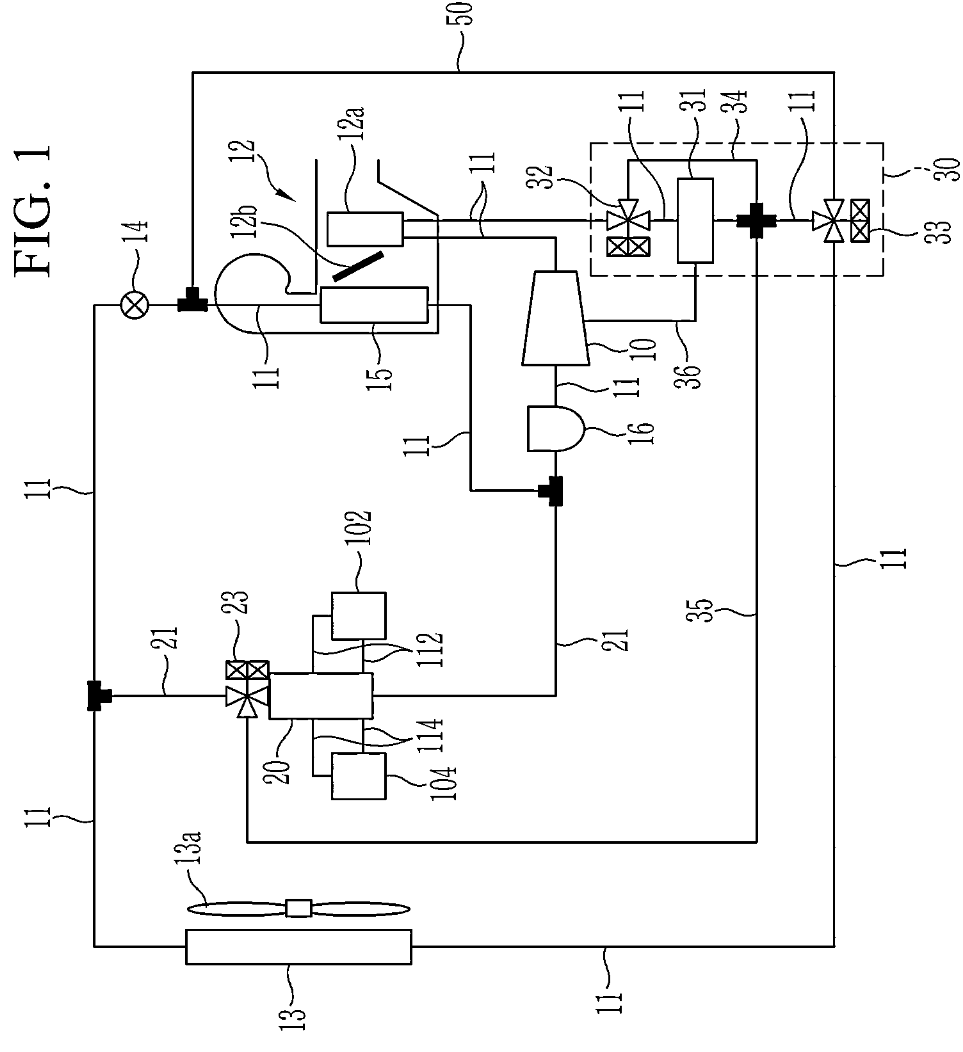
FIG. 1 is a block diagram of a heat pump system for a vehicle according to an embodiment.

Embodiments are hereinafter described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, may be exaggerated for clarity.

In addition, unless explicitly described to the contrary, the terms “comprise” and variations such as “comprises” or “comprising”, should be understood to imply the inclusion of stated elements but not the exclusion of any other elements.

Furthermore, terms, such as “ . . . unit”, “ . . . means”, “ . . . portions”, “ . . . part”, and “ . . . member” described in the specification, mean a unit of a comprehensive element that performs at least one function or operation.

When a component, device, element, or the like of the present disclosure is described as having a purpose or performing an operation, function, or the like, the component, device, or element should be considered herein as being “configured to” meet that purpose or perform that operation or function.

FIG. 1 is a block diagram of a heat pump system for a vehicle according to an embodiment.

According to a heat pump system for a vehicle according to an embodiment, by employing a gas injection device 30 configured to selectively operate in a selected air conditioning mode of a vehicle interior among a cooling mode or a heating mode, the cooling and heating performance may be improved.

According to the heat pump system for a vehicle, a cooling apparatus where a coolant is circulated and an air conditioner unit, which is an air-conditioner apparatus for cooling and heating the vehicle interior, may be interconnected with each other.

In other words, referring to FIG. 1, the heat pump system may include a cooling apparatus and an air conditioner unit. The air conditioner unit may include a compressor 10, a heating, ventilation, and air-conditioning (HVAC) module 12, a heat-exchanger 13, a first expansion valve 14, an evaporator 15, a chiller 20, a connection line 21, a second expansion valve 23, and the gas injection device 30.

First, the cooling apparatus may include an electrical component 102 and a battery module 104 where coolant is circulated.

The cooling apparatus may further include a radiator (not shown). The radiator may be disposed at a front of the vehicle. The heat-exchanger 13 may be disposed at a rear of the radiator.

In addition, a cooling fan 13*a* may be provided at a rear of the heat-exchanger 13. Accordingly, the radiator may cool the coolant through an operation of the cooling fan and heat-exchange with ambient air.

The electrical component 102 may be connected to the chiller 20 via a first coolant line 112 through which the coolant circulates. The battery module 104 may be connected to the chiller 20 via a second coolant line 114 through which the coolant circulates.

When recollecting the waste heat of the electrical component 102 at the time of heating the vehicle interior, the first coolant line 112 may be opened to connect the chiller 20 and the electrical component 102.

In addition, when cooling the battery module 104, or when recollecting the waste heat of the battery module 104 at the time of heating the vehicle interior, the second coolant line 114 may be opened to connect the chiller 20 and the battery module 104.

The coolant may selectively circulate the first coolant line 112 and the second coolant line 114 by an operation of a water pump (not shown).

The electrical component 102 may include an electric power control unit (EPCU), a motor, an inverter, an on-board charger (OBC), an autonomous driving controller, or the like.

The electric power control apparatus, the inverter, the motor, or the autonomous driving controller may generate heat while being driven, and the charger may generate heat when charging the battery module 104.

The electrical component 102 configured as such may be provided on the first coolant line 112 and may be cooled in a water-cooled manner.

In other words, when recollecting the waste heat of the electrical component 102 at the time of heating the vehicle interior, the heat generated by the electric power control apparatus, motor, inverter, charger, or autonomous driving controller may be recollected.

The battery module 104 may supply power to the electrical component 102 and the drive motor. Additionally, the battery module 104 may be configured as a water-cooled design that is cooled by the coolant flowing along the second coolant line 114.

In the present embodiment, the compressor 10 may compress a supplied refrigerant.

A HVAC module 12 may be internally provided with an internal condenser 12*a* and the evaporator 15 connected to the compressor 10 via the refrigerant line 11.

An opening/closing door 12*b* configured to adjust the air having passed through the evaporator 15 to selectively flow into the internal condenser 12*a* based on cooling or heating of the vehicle interior may be further provided inside the HVAC module 12.

In other words, the opening/closing door 12*b* may be opened at the time of heating the vehicle interior such that the ambient air having passed through the evaporator 15 may be introduced into the internal condenser 12*a*.

To the contrary, at the time of cooling the vehicle interior, the opening/closing door 12*b* may close a side to the internal condenser 12*a* such that the ambient air cooled while passing through the evaporator 15 may be directly introduced into the vehicle interior.

In the present embodiment, the heat-exchanger 13 may be connected to the internal condenser 12*a* via the refrigerant line 11. The heat-exchanger 13 may condense or evaporate the refrigerant by exchanging heat between the refrigerant supplied from the internal condenser 12*a* and air. In other words, the heat-exchanger 13 may be an air-cooled heat-exchanger.

The first expansion valve 14 may be provided on the refrigerant line 11 between the heat-exchanger 13 and the evaporator 15.

In addition, the evaporator 15 may be connected to the heat-exchanger 13 via the refrigerant line 11. When the refrigerant expanded by the first expansion valve 14 is introduced, the evaporator 15 may evaporate the refrigerant by exchanging heat with the air introduced into the HVAC module 12.

The air conditioner unit may further include an accumulator 16. The accumulator 16 may be provided on the refrigerant line 11 between the evaporator 15 and the compressor 10.

The accumulator 16 may supply only the gaseous refrigerant to the compressor 10, and thereby, improve the efficiency and durability of the compressor 10.

In the present embodiment, a first end of the connection line 21 may be connected to the refrigerant line 11 between the heat-exchanger 13 and the first expansion valve 14. A second end of the connection line 21 may be connected to the refrigerant line 11 between the compressor 10 and the evaporator 15.

The chiller 20 may be provided on the connection line 21. The chiller 20 may selectively circulate the coolant via one or all of the first coolant line 112 and the second coolant line 114.

In other words, the chiller 20 may be a water-cooled heat-exchanger into which the coolant is introduced.

Accordingly, the chiller 20 may exchange heat between the refrigerant introduced into the connection line 21 with the coolant selectively introduced from one or all of the first coolant line 112 and the second coolant line 114. As a result, the chiller 20 may adjust a temperature of the coolant.

In the present embodiment, the second expansion valve 23 may be provided on the connection line 21 at an upstream end of the chiller 20.

The second expansion valve 23 may be a 3-way electronic expansion valve configured to selectively expand the refrigerant while controlling the flow of the refrigerant and having two inlets and one outlet.

The upstream end of the chiller 20 and a downstream end of the chiller 20 may be set based on a flow direction of the refrigerant.

In other words, based on the direction in which the refrigerant flows along the refrigerant line 11, a location at which the refrigerant flows into the chiller 20 may be defined as the upstream end of the chiller 20, and a location where the refrigerant is discharged from the chiller 20 may be defined as the downstream end of the chiller 20.

When cooling the electrical component 102 or the battery module 104 by using the coolant having exchanged with the refrigerant, the second expansion valve 23 configured as such may expand the introduced refrigerant and flow the expanded refrigerant to the chiller 20.

In other words, when cooling the electrical component 102 or the battery module 104 at the time of cooling the vehicle interior, the second expansion valve 23 may expand the introduced refrigerant to decrease the temperature and flow the expanded refrigerant into the chiller 20. As a result, the second expansion valve 23 may further decrease the temperature of the coolant passing through the chiller 20.

Accordingly, the coolant whose temperature is decreased while passing through the chiller 20 may be introduced into the electrical component 102 or the battery module 104, such that more efficient cooling may be achieved.

To the contrary, when recollecting the waste heat generated from the electrical component 102 or the battery module 104 at the time of heating the vehicle interior, the second expansion valve 23 may selectively expand the refrigerant introduced via the connection line 21.

In other words, when heating the vehicle interior, the heat-exchanger 13 may evaporate the refrigerant through heat-exchange with the ambient air. Then, the evaporated refrigerant may be introduced into the second expansion valve 23 via the connection line 21.

At this time, the chiller 20 may recollect the waste heat of the electrical component 102 or the battery module 104 while exchanging heat between the supplied refrigerant and the coolant supplied from the electrical component 102 or the battery module 104.

When the refrigerant is supplied from the gas injection device 30 at the time of heating the vehicle interior, the second expansion valve 23 may supply the refrigerant to the chiller 20 with or without expansion.

In addition, the gas injection device 30 may be connected to the refrigerant line 11 between the internal condenser 12*a* and the heat-exchanger 13.

The gas injection device 30 may selectively expand and flow the refrigerant supplied from the internal condenser 12*a*. Additionally, the gas injection device 30 may selectively supply a partial refrigerant among the supplied refrigerant to the compressor 10 to increase the flow amount of the refrigerant circulating the refrigerant line 11.

The gas injection device 30 configured as such may be selectively operated at the time of heating the vehicle interior.

The gas injection device 30 may include a gas-liquid separator 31, a third expansion valve 32, a fourth expansion valve 33, a first line 34, a second line 35, and a supply line 36.

First, the gas-liquid separator 31 may be provided on the refrigerant line 11 between the internal condenser 12*a* and the heat-exchanger 13. The gas-liquid separator 31 may separate and selectively discharge a gaseous refrigerant and a liquid refrigerant among the interiorly introduced refrigerant.

The third expansion valve 32 may be provided on the refrigerant line 11 between the internal condenser 12*a* and the gas-liquid separator 31.

The third expansion valve 32 may selectively expand the refrigerant supplied from the internal condenser 12*a* and supply the expanded refrigerant to the gas-liquid separator 31.

To the contrary, the third expansion valve 32 may selectively expand the refrigerant supplied from the internal condenser 12*a* and may flow the expanded refrigerant into the first line 34 such that the refrigerant may bypass (e.g., detour) the gas-liquid separator 31.

The fourth expansion valve 33 may be provided on the refrigerant line 11 between the gas-liquid separator 31 and the heat-exchanger 13.

The fourth expansion valve 33 may selectively expand the refrigerant supplied from the gas-liquid separator 31 and may supply the expanded refrigerant or the refrigerant that is not expanded to the heat-exchanger 13.

In the present embodiment, one end of the first line 34 may be connected to the third expansion valve 32. A second end of the first line 34 may be connected to the refrigerant line 11 between the gas-liquid separator 31 and the fourth expansion valve 33.

The first line 34 may enable the refrigerant supplied from the internal condenser 12*a* based on an operation of the third expansion valve 32 to bypass the gas-liquid separator 31 such that the refrigerant may not be passed through.

In the present embodiment, a first end of the second line 35 may be connected to the second expansion valve 23. A second end of the second line 35 may be connected to the refrigerant line 11 between the gas-liquid separator 31 and the fourth expansion valve 33.

In addition, the supply line 36 may connect the gas-liquid separator 31 and the compressor 10. In other words, a first end of the supply line 36 may be connected to the gas-liquid separator 31. A second end of the supply line 36 may be connected to the compressor 10.

When the refrigerant is supplied to the gas-liquid separator 31, the supply line 36 configured as such may selectively supply the gaseous refrigerant from the gas-liquid separator 31 to the compressor 10.

In other words, the supply line 36 may connect the gas-liquid separator 31 and the compressor 10 such that the gaseous refrigerant separated by the gas-liquid separator 31 may be selectively introduced into the compressor 10.

The heat pump system may further include a dehumidification line 50. A first end of the dehumidification line 50 may be connected to the fourth expansion valve 33. A second end of the dehumidification line 50 may be connected to the refrigerant line 11 between the first expansion valve 14 and the evaporator 15.

The fourth expansion valve 33 may selectively expand the refrigerant supplied from the third expansion valve 32 via the first line 34, or the refrigerant supplied from the gas-liquid separator 31 and may supply the refrigerant to one or all of the heat-exchanger 13 and the dehumidification line 50.

In other words, when dehumidification is desired at the time of heating the vehicle interior, the dehumidification line 50 may be opened by an operation of the fourth expansion valve 33.

In the gas injection device 30 configured as such, the gas-liquid separator 31 may be operated in the case that the third expansion valve 32 expands the refrigerant and supplies the expanded refrigerant, in the state of heating the vehicle interior.

In more detail, when the third expansion valve 32 expands the refrigerant and supplies the expanded refrigerant to the gas-liquid separator 31. The gas-liquid separator 31 may supply the gaseous refrigerant among the supplied refrigerant to the compressor 10 via the supply line 36 to increase the flow amount of the refrigerant circulating the refrigerant line 11.

In the gas injection device 30 configured as such, the third expansion valve 32 and the fourth expansion valve 33 are selectively operated in at least one mode for a temperature adjustment of the vehicle interior and may selectively expand the refrigerant supplied to the gas injection device 30 while controlling the flow of the refrigerant.

In the present embodiment, the third expansion valve 32 and the fourth expansion valve 33 may be a 3-way electronic expansion valve configured to selectively expand the refrigerant while controlling the flow of the refrigerant and having one inlet and two outlets.

The heat pump system configured as such may control the flow of the refrigerant based on at least one mode for the temperature adjustment of the vehicle interior.

The at least one mode may include a first mode to a fifth mode.

First, in the first mode, the gas-liquid separator 31 may be operated, and while heating the vehicle interior, ambient air heat and waste heat of the electrical component 102 may be recollected.

In the second mode, the gas-liquid separator 31 may be operated, and while heating the vehicle interior, the waste heat of the electrical component 102 may be recollected.

In the third mode, the gas-liquid separator 31 may not be operated, and while heating the vehicle interior, the ambient air heat and the waste heat of the electrical component 102 may be recollected.

In the fourth mode, the gas-liquid separator 31 may not be operated, and while heating the vehicle interior, the waste heat of the electrical component 102 may be recollected.

In addition, in the fifth mode, the gas-liquid separator 31 may not be operated, and the battery module 104 may be cooled while cooling the vehicle interior.

An operation and action of a heat pump system according to an embodiment configured as such is described in detail with reference to FIGS. 2-6.

First, in a heat pump system for a vehicle according to an embodiment, the operation according to the first mode, in which the gas-liquid separator 31 is operated, for recollecting the ambient air heat and the waste heat of the electrical component 102 while heating the vehicle interior is described in detail with reference to FIG. 2.

Figure 2:
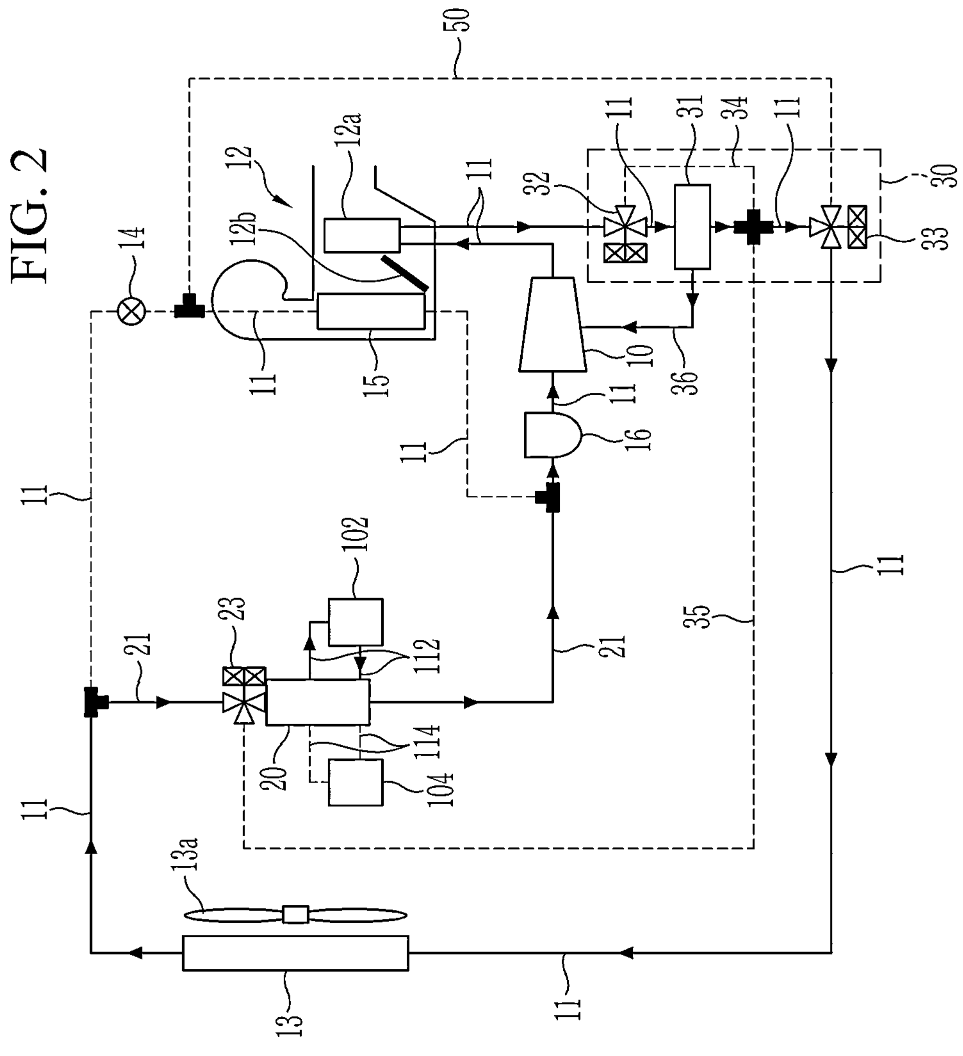
FIG. 2 is an operation diagram according to a first mode of a heat pump system for a vehicle according to an embodiment.

FIG. 2 is an operation diagram according to the first mode of a heat pump system for a vehicle according to an embodiment.

Referring to FIG. 2, in the first mode, the heat pump system may recollect the ambient air heat from the ambient air together with the waste heat of the electrical component 102, in the state that the gas-liquid separator 31 is operated.

First, in order to heat the vehicle interior, the compressor 10 is operated such that the refrigerant may flow along the refrigerant line 11.

In such a state, the first expansion valve 14 stops operating. Accordingly, the refrigerant is not supplied to the evaporator 15.

The connection line 21 may be opened by an operation of the second expansion valve 23. The second expansion valve 23 may supply the refrigerant introduced via the connection line 21 to the chiller 20 with or without expansion. The refrigerant line 11 connecting from the first end of the connection line 21 to the first expansion valve 14 may be closed. In addition, a partial refrigerant line 11 connected to an upstream end and a downstream end of the evaporator 15 may be closed.

In the present embodiment, the first line 34 may be closed by an operation of the third expansion valve 32.

The third expansion valve 32 may expand the refrigerant introduced via the refrigerant line 11 and supply the expanded refrigerant to the gas-liquid separator 31.

The second line 35 may be closed by the operation of the second expansion valve 23.

The supply line 36 may be opened. In addition, the dehumidification line 50 may be closed by the operation of the fourth expansion valve 33.

Accordingly, the gas-liquid separator 31 may supply the gaseous refrigerant among the interiorly introduced refrigerant to the compressor 10 via the opened supply line 36.

In other words, the gas injection device 30 may flow the gaseous refrigerant separated while passing through the gas-liquid separator 31 back into the compressor 10 via the supply line 36, and thereby, may increase the flow amount of the refrigerant circulating the refrigerant line 11.

The fourth expansion valve 33 may expand the refrigerant supplied from the gas-liquid separator 31 via the refrigerant line 11. The refrigerant expanded by the operation of the fourth expansion valve 33 may be supplied to the heat-exchanger 13 along the refrigerant line 11.

In other words, the liquid refrigerant discharged from the gas-liquid separator 31 may flow to the heat-exchanger 13 along the refrigerant line 11 that is opened by the operation of the fourth expansion valve 33.

The heat-exchanger 13 may evaporate the refrigerant supplied from the fourth expansion valve 33 along the refrigerant line 11 through heat-exchange with the ambient air. At this time, the refrigerant may absorb the ambient air heat from the ambient air.

The refrigerant evaporated at the heat-exchanger 13 may flow along the refrigerant line 11, and flow into the opened connection line 21.

The second expansion valve 23 may supply the refrigerant introduced from the heat-exchanger 13 via the refrigerant line 11 to the chiller 20 with or without expansion.

The refrigerant introduced into the chiller 20 may cool the coolant while being heat-exchanged with the coolant supplied from the electrical component 102 via the first coolant line 112.

At this time, the coolant may recollect the waste heat from the electrical component 102 while cooling the electrical component 102, thereby increasing the temperature. Through such operations, the coolant whose temperature is increased may be supplied to the chiller 20.

The chiller 20 may recollect the waste heat of the electrical component 102 while exchanging heat between the coolant supplied from the electrical component 102 via the first coolant line 112 and the refrigerant.

As such, the refrigerant having recollected the ambient air heat at the heat-exchanger 13 and having recollected the waste heat of the electrical component 102 at the chiller 20 may pass through the accumulator 16 along the refrigerant line 11 connected to the connection line 21, and then be supplied to the compressor 10.

In other words, the refrigerant having passed through the accumulator 16 and the refrigerant supplied from the gas-liquid separator 31 via the supply line 36 may be introduced into the compressor 10. The introduced refrigerant may be compressed by an operation of the compressor 10.

The refrigerant compressed at the compressor 10 may be supplied to the internal condenser 12*a* via the refrigerant line 11. The refrigerant supplied to the internal condenser 12*a* may increase the temperature of the ambient air introduced into the HVAC module 12.

The opening/closing door 12*b* is opened such that the ambient air introduced into the HVAC module 12 and having passed through the evaporator 15 may pass through the internal condenser 12*a*.

Accordingly, when passing through the evaporator 15 that is not supplied with the refrigerant, the ambient air introduced from the outside may be introduced at the room temperature state, which has not been cooled. The introduced ambient air may be converted to a high-temperature state while passing through the internal condenser 12*a* and then introduced into the vehicle interior, thereby implementing heating of the vehicle interior.

In addition, the refrigerant condensed at the internal condenser 12*a* may be supplied to the gas-liquid separator 31 by the operation of the third expansion valve 32.

Then, the heat pump system may repeatedly perform the above-described processes.

As such, a heat pump system according to an embodiment may recollect the ambient air heat at the heat-exchanger 13 while driving the vehicle, together with an operation of the gas injection device 30. The heat pump system may smoothly recollect the waste heat from the coolant whose temperature is increased at the chiller 20 while passing through the electrical component 102. As a result, the overall heating performance and efficiency of the heat pump system may be improved.

In addition, according to the present disclosure, the heating efficiency and performance may be improved while minimizing the usage of a separate electric heater.

In addition, the gas injection device 30 may increase the flow amount of the refrigerant circulating the refrigerant line 11, and thereby the heating performance may be maximized.

Although the present embodiment has described that the waste heat of the electrical component 102 and the ambient air heat are recollected together, it is not limited thereto, and the waste heat of the battery module 104 may also be recollected together.

In the present embodiment, the operation according to the second mode, in which the gas-liquid separator 31 is operated, for recollecting the waste heat of the electrical component 102 while heating the vehicle interior is described in detail with reference to FIG. 3.

Figure 3:
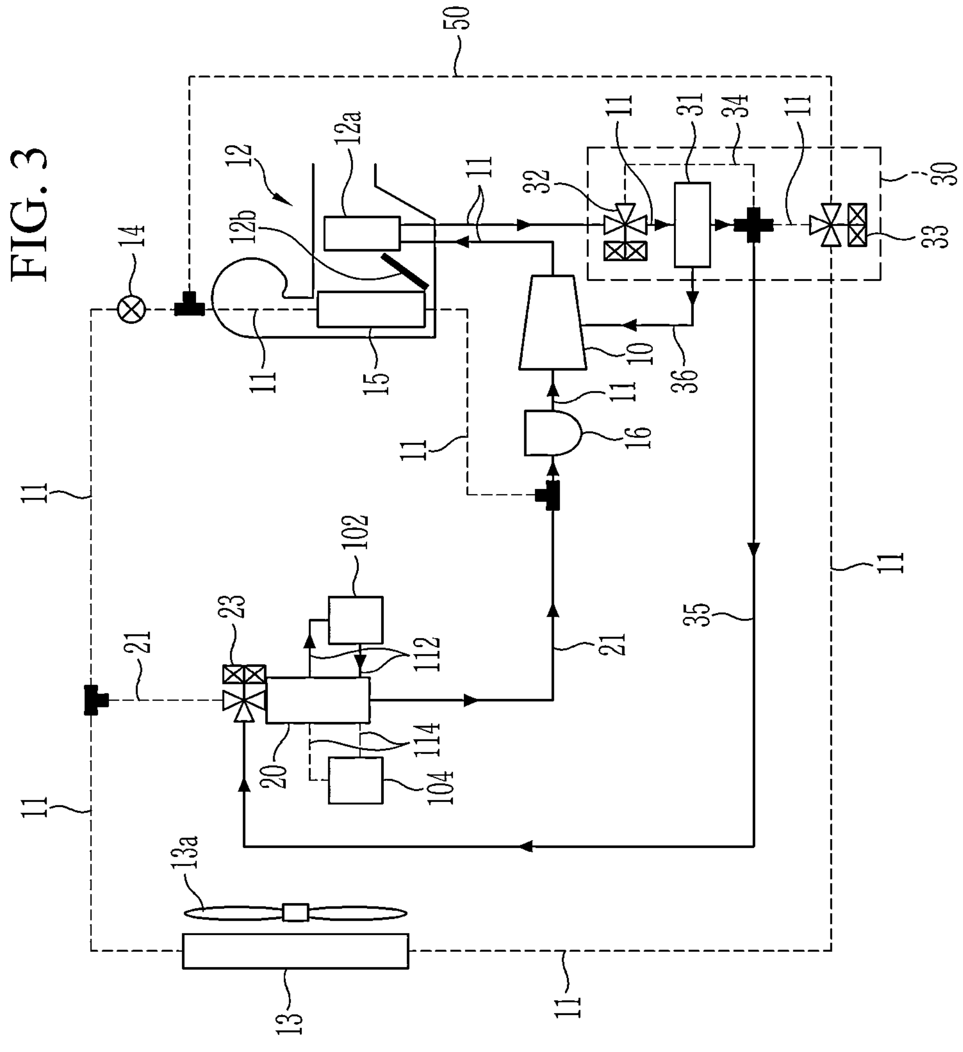
FIG. 3 is an operation diagram according to a second mode of a heat pump system for a vehicle according to an embodiment.

FIG. 3 is an operation diagram according to the second mode of a heat pump system for a vehicle according to an embodiment.

Referring to FIG. 3, in the second mode, the heat pump system may recollect the waste heat of the electrical component 102, in the state that the gas-liquid separator 31 is operated.

First, in order to heat the vehicle interior, the compressor 10 is operated such that the refrigerant may flow along the refrigerant line 11.

In such a state, the first expansion valve 14 stops operating. Accordingly, the refrigerant is not supplied to the evaporator 15.

Simultaneously, the refrigerant line 11 connecting the heat-exchanger 13 and the fourth expansion valve 33 may be closed by the operation of the fourth expansion valve 33. In addition, the refrigerant line 11 connecting the heat-exchanger 13 and the first expansion valve 14 may be closed.

The partial refrigerant line 11 connected to the upstream end and downstream end of the evaporator 15 may be closed.

In addition, a partial connection line 21 connecting from the first end of the connection line 21 to the second expansion valve 23 may be closed. In addition, a remaining connection line 21 connecting from the second end of the connection line 21 to the chiller 20 may be opened.

In the present embodiment, the first line 34 may be closed by the operation of the third expansion valve 32. At the same time, the second line 35 may be opened by the operation of the second expansion valve 23.

In addition, the supply line 36 may be opened. The third expansion valve 32 may expand the refrigerant introduced via the refrigerant line 11 and supply the expanded refrigerant to the gas-liquid separator 31.

The refrigerant line 11 connecting from the second end of the second line 35 to the fourth expansion valve 33 may be closed by the operation of the fourth expansion valve 33. In addition, the dehumidification line 50 may be closed by the operation of the fourth expansion valve 33.

In this case, the operation of the fourth expansion valve 33 may be stopped.

Accordingly, the gas-liquid separator 31 may supply the gaseous refrigerant among the interiorly introduced refrigerant to the compressor 10 via the opened supply line 36.

In other words, the gas injection device 30 may flow the gaseous refrigerant separated while passing through the gas-liquid separator 31 back into the compressor 10 via the supply line 36, and thereby, may increase the flow amount of the refrigerant circulating the refrigerant line 11.

The refrigerant discharged from the gas-liquid separator 31 to the refrigerant line 11 may be supplied to the second expansion valve 23 along the opened second line 35.

The second expansion valve 23 may expand the refrigerant introduced via the second line 35 and supply the expanded refrigerant to the chiller 20.

The refrigerant introduced into the chiller 20 may cool the coolant while being heat-exchanged with the coolant supplied from the electrical component 102 via the first coolant line 112.

At this time, the coolant may recollect the waste heat from the electrical component 102 while cooling the electrical component 102, thereby increasing the temperature.

Through such operations, the coolant whose temperature is increased may be supplied the chiller 20.

The chiller 20 may recollect the waste heat of the electrical component 102 while exchanging heat between the coolant supplied from the electrical component 102 via the first coolant line 112 and the refrigerant.

As such, the refrigerant having recollected the waste heat of the electrical component 102 at the chiller 20 may pass through the accumulator 16 along the refrigerant line 11 connected to the connection line 21, and then be supplied to the compressor 10.

In other words, the refrigerant having passed through the accumulator 16 and the refrigerant supplied from the gas-liquid separator 31 via the supply line 36 may be introduced into the compressor 10. The introduced refrigerant may be compressed by the operation of the compressor 10.

The refrigerant compressed at the compressor 10 may be supplied to the internal condenser 12*a* via the refrigerant line 11. The refrigerant supplied to the internal condenser 12*a* may increase the temperature of the ambient air introduced into the HVAC module 12.

The opening/closing door 12*b* is opened such that the ambient air introduced into the HVAC module 12 and having passed through the evaporator 15 may pass through the internal condenser 12*a*.

Accordingly, when passing through the evaporator 15 that is not supplied with the refrigerant, the ambient air introduced from the outside may be introduced at the room temperature state, which has not been cooled. The introduced ambient air may be converted to a high-temperature state while passing through the internal condenser 12*a* and then introduced into the vehicle interior, thereby implementing heating of the vehicle interior.

In addition, the refrigerant condensed at the internal condenser 12*a* may be supplied to the gas-liquid separator 31 by the operation of the third expansion valve 32.

Then, the heat pump system may repeatedly perform the above-described processes.

As such, a heat pump system according to an embodiment may smoothly recollect the waste heat from the coolant whose temperature is increased at the chiller 20 while passing through the electrical component 102 while driving the vehicle together with the operation of the gas injection device 30. As a result, the overall heating performance and efficiency of the heat pump system may be improved.

In addition, according to the present disclosure, the heating efficiency and performance may be improved while minimizing the usage of a separate electric heater.

In addition, the gas injection device 30 may increase the flow amount of the refrigerant circulating the refrigerant line 11, and thereby the heating performance may be maximized.

Although the present embodiment has described that the waste heat of the electrical component 102 is recollected, it is not limited thereto, and the waste heat of the battery module 104 may also be recollected.

In the present embodiment, the operation according to the third mode, in which the gas-liquid separator 31 is not operated, for recollecting the ambient air heat and the waste heat of the electrical component 102 while heating the vehicle interior is described in detail with reference to FIG. 4.

Figure 4:
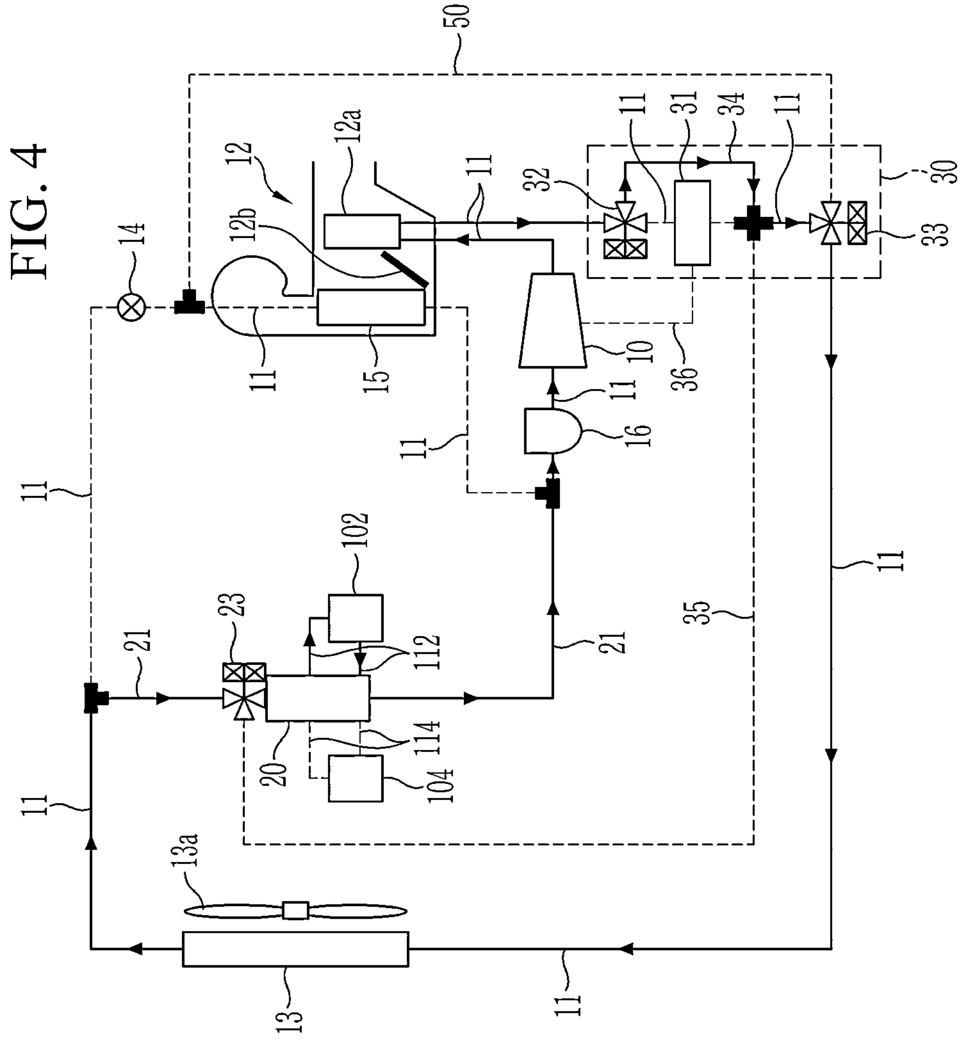
FIG. 4 is an operation diagram according to a third mode of a heat pump system for a vehicle according to an embodiment.

FIG. 4 is an operation diagram according to the third mode of a heat pump system for a vehicle according to an embodiment.

Referring to FIG. 4, in the third mode, the heat pump system may recollect the ambient air heat from ambient air together with the waste heat of the electrical component 102, in the state that the gas-liquid separator 31 is not operated.

First, in order to heat the vehicle interior, the compressor 10 is operated such that the refrigerant may flow along the refrigerant line 11.

In such a state, the first expansion valve 14 stops operating. Accordingly, the refrigerant is not supplied to the evaporator 15.

The connection line 21 may be opened by the operation of the second expansion valve 23. The second expansion valve 23 may supply the refrigerant introduced via the connection line 21 to the chiller 20 without expansion.

The refrigerant line 11 connecting from the first end of the connection line 21 to the first expansion valve 14 may be closed. In addition, the partial refrigerant line 11 connected to the upstream end and downstream end of the evaporator 15 may be closed.

In the present embodiment, the first line 34 may be opened by the operation of the third expansion valve 32.

Accordingly, the third expansion valve 32 may flow the introduced refrigerant from the internal condenser 12*a* to the first line 34 such that the refrigerant may bypass the gas-liquid separator 31.

By such operations, the flowing of the refrigerant into the gas-liquid separator 31 may be blocked. In other words, the refrigerant discharged from the internal condenser 12*a* may not be introduced into the gas-liquid separator 31.

The partial refrigerant line 11 connecting the third expansion valve 32 and the gas-liquid separator 31 and the partial refrigerant line 11 connecting the second end of the first line 34 and the gas-liquid separator 31 may be closed.

The second line 35 may be closed by the operation of the second expansion valve 23. In addition, the supply line 36 may be closed.

In such a state, at least one of the third expansion valve 32 and the fourth expansion valve 33 may expand the introduced refrigerant such that the expanded refrigerant may be supplied to the heat-exchanger 13.

In other words, one or all of the third expansion valve 32 and the fourth expansion valve 33 may expand the refrigerant supplied from the internal condenser 12*a* and supply the expanded refrigerant to the heat-exchanger 13.

The heat-exchanger 13 may evaporate the refrigerant supplied along the refrigerant line 11 through heat-exchange with the ambient air. At this time, the refrigerant may absorb the ambient air heat from the ambient air.

The refrigerant evaporated at the heat-exchanger 13 may flow along the refrigerant line 11, and flow into the opened connection line 21.

The second expansion valve 23 may supply the refrigerant introduced from the heat-exchanger 13 via the refrigerant line 11 to the chiller 20 without expansion.

The refrigerant introduced into the chiller 20 may cool the coolant while exchanging heat with the coolant supplied from the electrical component 102 via the first coolant line 112.

At this time, the coolant may recollect the waste heat from the electrical component 102 while cooling the electrical component 102, thereby increasing the temperature. Through such operations, the coolant whose temperature is increased may be supplied to the chiller 20.

The chiller 20 may recollect the waste heat of the electrical component 102 while exchanging heat between the coolant supplied from the electrical component 102 via the first coolant line 112 and the refrigerant.

As such, the refrigerant having recollected the ambient air heat at the heat-exchanger 13 and having recollected the waste heat of the electrical component 102 at the chiller 20 may pass through the accumulator 16 along the refrigerant line 11 connected to the connection line 21, and then be supplied to the compressor 10.

In other words, the refrigerant having passed through the accumulator 16 may be introduced into the compressor 10. The introduced refrigerant may be compressed by the operation of the compressor 10.

The refrigerant compressed at the compressor 10 may be supplied to the internal condenser 12*a* via the refrigerant line 11. The refrigerant supplied to the internal condenser 12*a* may increase the temperature of the ambient air introduced into the HVAC module 12.

The opening/closing door 12*b* is opened such that the ambient air introduced into the HVAC module 12 and having passed through the evaporator 15 may pass through the internal condenser 12*a*.

Accordingly, when passing through the evaporator 15 that is not supplied with the refrigerant, the ambient air introduced from the outside may be introduced at the room temperature state, which has not been cooled. The introduced ambient air may be converted to a high-temperature state while passing through the internal condenser 12*a* and then introduced into the vehicle interior, thereby implementing heating of the vehicle interior.

In addition, the refrigerant condensed at the internal condenser 12*a* may flow along the first line 34 opened by the third expansion valve 32. The refrigerant flowing via the first line 34 may be supplied to the heat-exchanger 13 by the operation of the fourth expansion valve 33.

Then, the heat pump system may repeatedly perform the above-described processes.

Accordingly, the refrigerant circulating in the heat pump system may recollect the ambient air heat at the heat-exchanger 13 and may smoothly recollect the waste heat from the coolant whose temperature is increased at the chiller 20 while passing through the electrical component 102. As a result, the overall heating performance and efficiency of the heat pump system may be improved.

In addition, according to the present disclosure, the heating efficiency and performance may be improved while minimizing the usage of a separate electric heater.

Although the present embodiment has described that the waste heat of the electrical component 102 and the ambient air heat are recollected together, it is not limited thereto. At least one of the ambient air heat, the waste heat of the electrical component 102, or the waste heat of the battery module 104 may be selectively recollected.

In the present embodiment, the operation according to the fourth mode, in which the gas-liquid separator 31 is not operated, for recollecting the waste heat of the electrical component 102 while heating the vehicle interior is described in detail with reference to FIG. 5.

Figure 5:
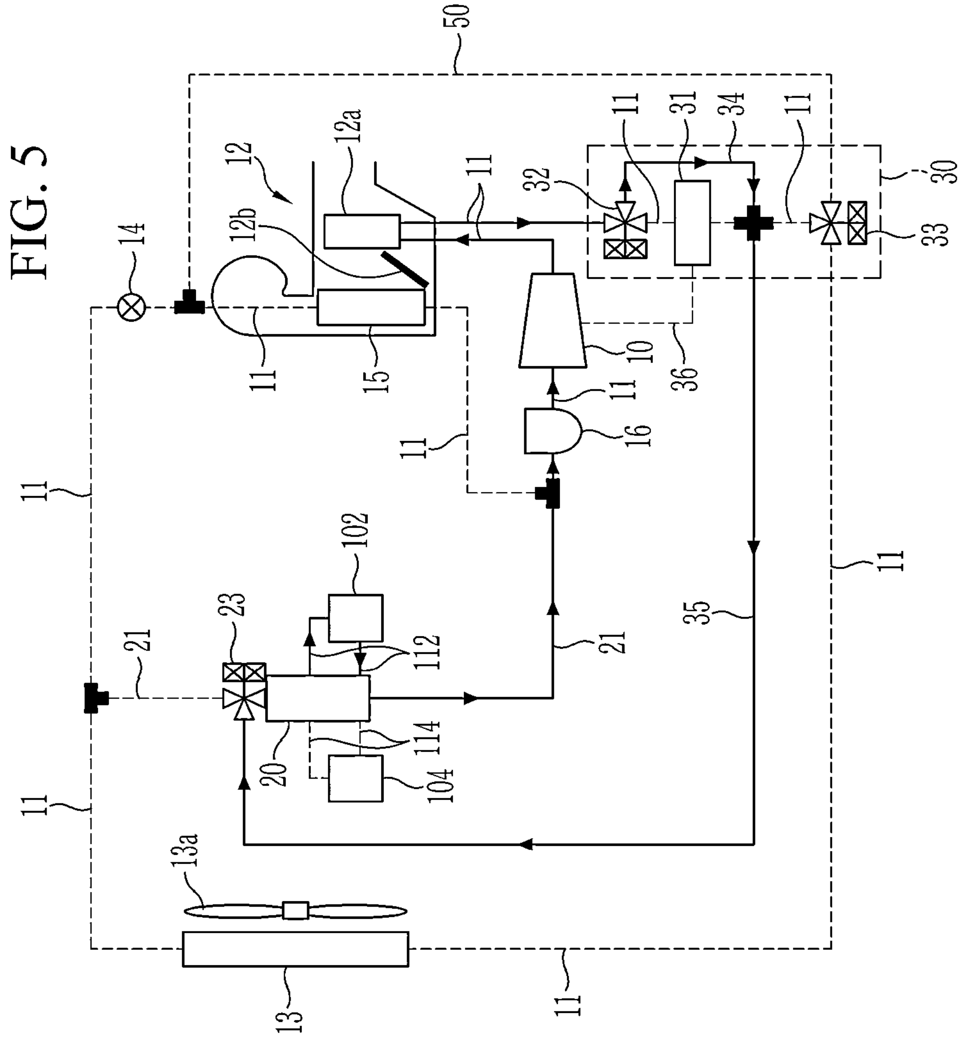
FIG. 5 is an operation diagram according to a fourth mode of a heat pump system for a vehicle according to an embodiment.

FIG. 5 is an operation diagram according to the fourth mode of a heat pump system for a vehicle according to an embodiment.

Referring to FIG. 5, in the fourth mode, the heat pump system may recollect the waste heat of the electrical component 102, in the state that the gas-liquid separator 31 is not operated.

First, in order to heat the vehicle interior, the compressor 10 is operated such that the refrigerant may flow along the refrigerant line 11.

In such a state, the first expansion valve 14 stops operating. Accordingly, the refrigerant is not supplied to the evaporator 15.

Simultaneously, the refrigerant line 11 connecting the heat-exchanger 13 and the fourth expansion valve 33 may be closed by the operation of the fourth expansion valve 33. In addition, the refrigerant line 11 connecting the heat-exchanger 13 and the first expansion valve 14 may be closed.

The partial refrigerant line 11 connected to the upstream end and downstream end of the evaporator 15 may be closed.

In addition, the partial connection line 21 connecting from the first end of the connection line 21 to the second expansion valve 23 may be closed. In addition, the remaining connection line 21 connecting from the second end of the connection line 21 to the chiller 20 may be opened.

In the present embodiment, the first line 34 may be opened by the operation of the third expansion valve 32.

Accordingly, the third expansion valve 32 may flow the introduced refrigerant from the internal condenser 12*a* to the first line 34 such that the refrigerant may bypass the gas-liquid separator 31.

By such operations, the flowing of the refrigerant into the gas-liquid separator 31 may be blocked. In other words, the refrigerant discharged from the internal condenser 12*a* may not be introduced into the gas-liquid separator 31.

The partial refrigerant line 11 connecting the third expansion valve 32 and the gas-liquid separator 31 and the partial refrigerant line 11 connecting the second end of the first line 34 and the gas-liquid separator 31 may be closed.

The second line 35 may be opened by the operation of the second expansion valve 23. In addition, the supply line 36 may be closed.

At least one of the second expansion valve 23 and the third expansion valve 32 may expand the introduced refrigerant such that the expanded refrigerant may be introduced into the chiller 20.

In addition, the operation of the fourth expansion valve 33 may be stopped.

In other words, one or all of the second expansion valve 23 and the third expansion valve 32 may expand the refrigerant supplied from the internal condenser 12*a* and supply the expanded refrigerant to the chiller 20.

The refrigerant introduced into the chiller 20 may cool the coolant while being heat-exchanged with the coolant supplied from the electrical component 102 via the first coolant line 112.

At this time, the coolant may recollect the waste heat from the electrical component 102 while cooling the electrical component 102, thereby increasing the temperature. Through such operations, the coolant whose temperature is increased may be supplied to the chiller 20.

The chiller 20 may recollect the waste heat of the electrical component 102 while exchanging heat between the coolant supplied from the electrical component 102 via the first coolant line 112 and the refrigerant.

As such, the refrigerant having recollected the waste heat of the electrical component 102 at the chiller 20 may pass through the accumulator 16 along the refrigerant line 11 connected to the connection line 21, and then be supplied to the compressor 10.

In other words, the refrigerant having passed through the accumulator 16 may be introduced into the compressor 10. The introduced refrigerant may be compressed by the operation of the compressor 10.

The refrigerant compressed at the compressor 10 may be supplied to the internal condenser 12*a* via the refrigerant line 11. The refrigerant supplied to the internal condenser 12*a* may increase the temperature of the ambient air introduced into the HVAC module 12.

The opening/closing door 12*b* is opened such that the ambient air introduced into the HVAC module 12 and having passed through the evaporator 15 may pass through the internal condenser 12*a*.

Accordingly, when passing through the evaporator 15 that is not supplied with the refrigerant, the ambient air introduced from the outside may be introduced at the room temperature state, which has not been cooled. The introduced ambient air may be converted to a high-temperature state while passing through the internal condenser 12*a* and then introduced into the vehicle interior, thereby implementing heating of the vehicle interior.

In addition, the refrigerant condensed at the internal condenser 12*a* may flow along the first line 34 opened by the third expansion valve 32. The refrigerant flowing via the first line 34 may be supplied to the chiller 20 along the second line 35.

Then, the heat pump system may repeatedly perform the above-described processes.

Accordingly, the refrigerant circulating in the heat pump system may smoothly recollect the waste heat from the coolant whose temperature is increased at the chiller 20 while passing through the electrical component 102. As a result, the overall heating performance and efficiency of the heat pump system may be improved.

In addition, according to the present disclosure, the heating efficiency and performance may be improved while minimizing the usage of a separate electric heater.

Although the present embodiment has described that the waste heat of the electrical component 102 is recollected, it is not limited thereto. At least one of the waste heat of the electrical component 102 and the waste heat of the battery module 104 may be selectively recollected.

Although it is described that the dehumidification line 50 is closed in the first mode to the fourth mode, it is not limited thereto. When dehumidification is desired while heating the vehicle interior, the dehumidification line 50 may be opened by the operation of the fourth expansion valve 33.

At this time, the fourth expansion valve 33 may expand the refrigerant introduced from the internal condenser 12*a* or the gas-liquid separator 31. Thereafter, the fourth expansion valve 33 may flow the expanded refrigerant to the dehumidification line 50.

Accordingly, the expanded refrigerant may be introduced into the evaporator 15 along the dehumidification line 50 and the partial refrigerant line 11. The opening/closing door 12*b* is opened such that the ambient air introduced into the HVAC module 12 and having passed through the evaporator 15 may pass through the internal condenser 12*a*.

In other words, the ambient air introduced into the HVAC module 12 may be dehumidified while passing through the evaporator 15 by the low-temperature refrigerant introduced into the evaporator 15. Thereafter, by being converted to a high-temperature state while passing through the internal condenser 12*a* and then introduced into the vehicle interior, it may heat and dehumidify the vehicle interior.

Through such operations, the heat pump system may heat the vehicle interior, and at the same time, perform dehumidification.

In addition, the operation according to the fifth mode, in which the gas-liquid separator 31 is not operated, for cooling the battery module 104 while cooling the vehicle interior is described in detail with reference to FIG. 6.

Figure 6:
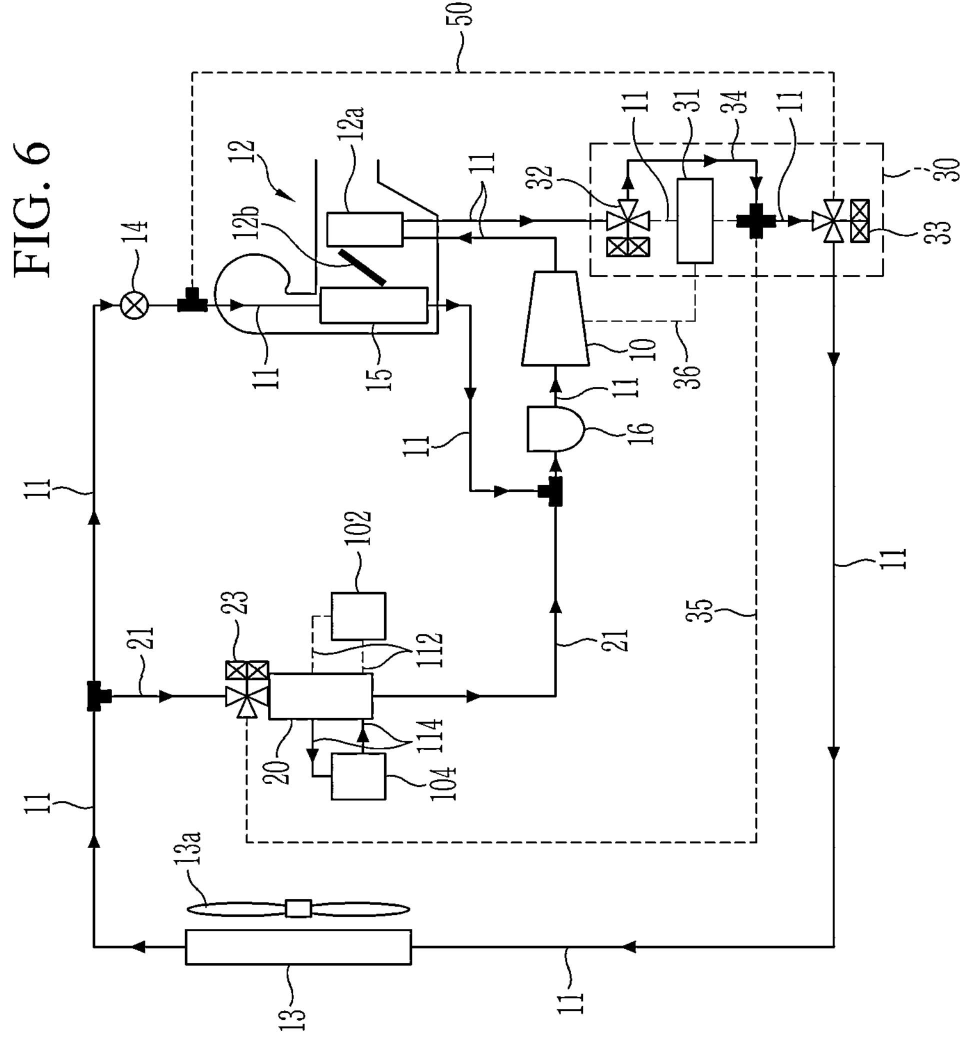
FIG. 6 is an operation diagram according to a fifth mode of a heat pump system for a vehicle according to an embodiment.

FIG. 6 is an operation diagram according to the fifth mode of a heat pump system for a vehicle according to an embodiment.

Referring to FIG. 6, in the fifth mode, the heat pump system may cool the battery module 104, in the state that the gas-liquid separator 31 is not operated.

First, in order to cool the vehicle interior, the compressor 10 is operated such that the refrigerant may flow along the refrigerant line 11.

In such a state, the refrigerant line 11 connecting the heat-exchanger 13 and the evaporator 15 may be opened by an operation of the first expansion valve 14.

The connection line 21 may be opened by the operation of the second expansion valve 23.

Simultaneously, the first line 34 may be opened by the operation of the third expansion valve 32.

Accordingly, the third expansion valve 32 may flow the introduced refrigerant from the internal condenser 12*a* to the first line 34 such that the refrigerant may bypass the gas-liquid separator 31.

The third expansion valve 32 may flow the refrigerant introduced via the refrigerant line 11 to the first line 34 without expansion.

By such operations, the flowing of the refrigerant into the gas-liquid separator 31 may be blocked. In other words, the refrigerant discharged from the internal condenser 12*a* may not be introduced into the gas-liquid separator 31.

The partial refrigerant line 11 connecting the third expansion valve 32 and the gas-liquid separator 31 and the partial refrigerant line 11 connecting the second end of the first line 34 and the gas-liquid separator 31 may be closed.

The second line 35 may be closed by the operation of the second expansion valve 23. In addition, the supply line 36 may be closed.

In other words, the refrigerant flowing via the first line 34 may be introduced into the fourth expansion valve 33 along the partial refrigerant line 11.

The fourth expansion valve 33 may supply the supplied refrigerant to the heat-exchanger 13 without expansion.

The heat-exchanger 13 may condense the refrigerant supplied along the refrigerant line 11 through heat-exchange with the ambient air. The refrigerant condensed at the heat-exchanger 13 may flow along the refrigerant line 11.

A partial refrigerant among the refrigerant flowing from the heat-exchanger 13 along the refrigerant line 11 may be introduced into the opened connection line 21.

The second expansion valve 23 may expand the refrigerant introduced via the connection line 21 and supply the expanded refrigerant to the chiller 20.

The refrigerant introduced into the chiller 20 may cool the coolant while being heat-exchanged with the coolant supplied from the battery module 104 via the second coolant line 114.

The coolant cooled at the chiller 20 is supplied to the battery module 104 along the second coolant line 114. Accordingly, the battery module 104 may be efficiently cooled by the coolant cooled at the chiller 20.

In other words, the coolant circulating via the second coolant line 114 may efficiently cool the battery module 104 while repeatedly performing the above-described operation.

A remaining refrigerant among the refrigerant flowing from the heat-exchanger 13 along the refrigerant line 11 may be introduced into the first expansion valve 14 along the refrigerant line 11.

The first expansion valve 14 may expand the refrigerant supplied from the heat-exchanger 13 via the refrigerant line 11 and flow the expanded refrigerant to the refrigerant line 11.

In other words, the refrigerant expanded at the first expansion valve 14 may be introduced into the evaporator 15 along the refrigerant line 11.

The ambient air introduced into the HVAC module 12 may be cooled while passing through the evaporator 15 by the low-temperature refrigerant introduced into the evaporator 15.

At this time, the opening/closing door 12*b* may be closed such that the cooled ambient air may not pass through the internal condenser 12*a*. Therefore, the cooled ambient air may cool the vehicle interior by being directly introduced into the vehicle interior.

The refrigerant having passed through the evaporator 15 and the chiller 20 respectively may be introduced into the accumulator 16. Thereafter, the refrigerant may pass through the accumulator 16 and flow into the compressor 10.

The refrigerant introduced into the compressor 10 may be compressed by the operation of the compressor 10.

The refrigerant compressed at the compressor 10 may pass through the internal condenser 12*a*, and then may be supplied to the third expansion valve 32 along the refrigerant line 11, in which the above-described processes may be repeatedly performed.

In other words, while repeatedly performing the above-described processes, the heat pump system according to an embodiment may cool the vehicle interior without the operation of the gas injection device 30.

Simultaneously, the heat pump system may efficiently cool the battery module 104 by using the low-temperature coolant cooled at the chiller 20.

Therefore, as described above, according to a heat pump system for a vehicle according to an embodiment, the flow amount of the refrigerant may be increased by employing the gas injection device 30 configured to selectively operate at the time of heating the vehicle interior, and thereby the heating performance may be improved.

By using a chiller 20 where the coolant and the refrigerant exchange heat, the waste heat of the electrical component 102 may be recollected and the temperature of the battery module 104 may be adjusted.

In addition, according to the present disclosure, the performance of the system by using the gas injection device 30 may be maximized while minimizing the required components, and accordingly, streamlining and simplification of the system may be achieved.

In addition, according to the present disclosure, at the time of heating the vehicle interior, by selectively recollecting the ambient air heat or the waste heat of the electrical component 102 and using it for heating the vehicle interior, the heating efficiency may be improved.

In addition, according to an embodiment, by efficiently adjusting the temperature of the battery module 104, the optimal performance of the battery module 104 may be enabled, and the overall travel distance of the vehicle may be increased due to the efficient management of the battery module 104.

In addition, according to an embodiment, it is possible to reduce manufacturing cost and weight through the simplification of an entire system, and thus improve space utilization.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

10: compressor
11: refrigerant line
12: HVAC module
12*a*: internal condenser
12*b*: the opening/closing door
13: heat-exchanger
13*a*: cooling fan
14: first expansion valve
15: evaporator
16: accumulator
20: chiller
21: connection line
23: second expansion valve
30: gas injection device
31: gas-liquid separator
32: third expansion valve
33: fourth expansion valve
34, 35: first and second lines
36: supply line
50: dehumidification line
102: electrical component
104: battery module
112, 114: first and second coolant lines

What is claimed is:

1. A heat pump system for a vehicle, the heat pump system comprising:

a compressor configured to compress a refrigerant;

a heating, ventilation, and air conditioning (HVAC) module internally provided with an internal condenser, an evaporator connected to the compressor via a refrigerant line, and an opening/closing door configured to adjust ambient air having passed through the evaporator to selectively flow into the internal condenser based on a cooling or heating mode of a vehicle interior;

a heat-exchanger connected to the internal condenser via the refrigerant line, and configured to condense or evaporate the refrigerant by exchanging heat between the refrigerant supplied from the internal condenser and air;

a first expansion valve connected to the heat-exchanger via the refrigerant line;

a connection line having a first end connected to the refrigerant line between the heat-exchanger and the first expansion valve and a second end connected to the refrigerant line between the heat-exchanger and the evaporator;

a chiller provided on the connection line, and configured to adjust a temperature of a coolant by exchanging heat between the refrigerant introduced into the connection line and a coolant that is selectively introduced;

a second expansion valve provided on the connection line at an upstream end of the chiller; and a gas injection device connected to the refrigerant line between the internal condenser and the heat-exchanger, the gas injection device configured to selectively expand and flow the refrigerant supplied from the internal condenser, to selectively supply a partial refrigerant among the supplied refrigerant to the compressor, and to increase a flow amount of the refrigerant circulating the refrigerant line, wherein a flow of the refrigerant is controlled based on at least one mode for a temperature adjustment of the vehicle interior.

2. The heat pump system of claim 1, wherein the gas injection device comprises:

a gas-liquid separator provided on the refrigerant line between the internal condenser and the heat-exchanger, and configured to separate and selectively discharge a gaseous refrigerant and a liquid refrigerant among supplied refrigerant;

a third expansion valve provided on the refrigerant line between the internal condenser and the gas-liquid separator;

a fourth expansion valve provided on the refrigerant line between the gas-liquid separator and the heat-exchanger;

a first line having a first end connected to the third expansion valve and a second end connected to the refrigerant line between the gas-liquid separator and the fourth expansion valve;

a second line having a first end connected to the second expansion valve and a second end connected to the refrigerant line between the gas-liquid separator and the fourth expansion valve; and a supply line having a first end connected to the gas-liquid separator and a second end connected to the compressor.

3. The heat pump system of claim 2, wherein the third expansion valve is configured to:

selectively expand the refrigerant supplied from the internal condenser and supply the expanded refrigerant to the gas-liquid separator; or selectively expand the refrigerant supplied from the internal condenser and flow the expanded refrigerant into the first line such that the refrigerant bypasses the gas-liquid separator.

4. The heat pump system of claim 2, further comprising a dehumidification line having a first end connected to the fourth expansion valve and a second end connected to the refrigerant line between the first expansion valve and the evaporator.

5. The heat pump system of claim 4, wherein the fourth expansion valve is configured to selectively expand the refrigerant supplied from the third expansion valve via the first line or expand the refrigerant supplied from the gas-liquid separator and to supply the refrigerant to one or both the heat-exchanger and the dehumidification line.

6. The heat pump system of claim 4, wherein the dehumidification line is opened by an operation of the fourth expansion valve when dehumidification is included at a time of heating the vehicle interior.

7. The heat pump system of claim 2, wherein the third expansion valve and the fourth expansion valve are configured to selectively operate in the at least one mode for the temperature adjustment of the vehicle interior and to selectively expand the refrigerant supplied to the gas injection device while controlling the flow of the refrigerant.

8. The heat pump system of claim 2, wherein the gas-liquid separator is operated when the third expansion valve expands and supplies the refrigerant, in the state of heating the vehicle interior, and supplies the gaseous refrigerant among the supplied refrigerant to the compressor through the supply line, to increase flow amount of the refrigerant circulating the refrigerant line.

9. The heat pump system of claim 2, wherein the second expansion valve, the third expansion valve, and the fourth expansion valve are 3-way electronic expansion valves configured to selectively expand the refrigerant while controlling the flow of the refrigerant.

10. The heat pump system of claim 2, wherein the at least one mode comprises:

a first mode, in which the gas-liquid separator is operated, for recollecting waste heat of an ambient air heat and waste heat of an electrical component while heating the vehicle interior;

a second mode, in which the gas-liquid separator is operated, for heating the vehicle interior and recollecting the waste heat of the electrical component;

a third mode, in which the gas-liquid separator is not operated, for recollecting the ambient air heat and the waste heat of the electrical component while heating the vehicle interior;

a fourth mode, in which the gas-liquid separator is not operated, for recollecting the waste heat of the electrical component while heating the vehicle interior; and a fifth mode, in which the gas-liquid separator is not operated, for cooling a battery module while cooling the vehicle interior.

11. The heat pump system of claim 10, wherein, in the first mode:

an operation of the first expansion valve is stopped;

the connection line is opened by an operation of the second expansion valve;

the refrigerant line connecting a first end of the connection line to the first expansion valve is closed;

a partial refrigerant line connected to an upstream end and a downstream end of the evaporator is closed;

the first line is closed by an operation of the third expansion valve;

the second line is closed by the operation of the second expansion valve;

the supply line is opened;

the second expansion valve supplies the refrigerant introduced via the connection line to the chiller with or without expansion;

the third expansion valve expands the refrigerant introduced via the refrigerant line and supplies the expanded refrigerant to the gas-liquid separator;

the fourth expansion valve expands the refrigerant supplied from the gas-liquid separator and supplies the expanded refrigerant to the heat-exchanger; and the gas-liquid separator supplies the gaseous refrigerant among the supplied refrigerant to the compressor via the opened supply line.

12. The heat pump system of claim 10, wherein, in the second mode:

an operation of the first expansion valve is stopped;

the refrigerant line connecting the heat-exchanger and the fourth expansion valve is closed by an operation of the fourth expansion valve;

the refrigerant line connecting the heat-exchanger and the first expansion valve is closed;

a partial refrigerant line connected to an upstream end and a downstream end of the evaporator is closed;

a partial connection line connecting a first end of the connection line to the second expansion valve is closed;

a remaining connection line connecting a second end of the connection line to the chiller is opened;

the first line is closed by an operation of the third expansion valve;

the second line is opened by an operation of the second expansion valve;

the supply line is opened;

the refrigerant discharged from the gas-liquid separator to the refrigerant line is supplied to the second expansion valve along the opened second line;

the second expansion valve expands the refrigerant introduced via the second line and supplies the expanded refrigerant to the chiller;

the third expansion valve expands the refrigerant introduced via the refrigerant line and supplies the expanded refrigerant to the gas-liquid separator;

the operation of the fourth expansion valve is stopped; and the gas-liquid separator supplies the gaseous refrigerant among the supplied refrigerant to the compressor via the opened supply line.

13. The heat pump system of claim 10, wherein, in the third mode:

an operation of the first expansion valve is stopped;

the connection line is opened by an operation of the second expansion valve;

the refrigerant line connecting a first end of the connection line to the first expansion valve is closed;

a partial refrigerant line connected to an upstream end and a downstream end of the evaporator is closed;

the first line is opened by an operation of the third expansion valve;

a partial refrigerant line connecting the third expansion valve and the gas-liquid separator and a partial refrigerant line connecting a second end of the first line and the gas-liquid separator are closed;

the second line is closed by the operation of the second expansion valve;

the supply line is closed;

the second expansion valve supplies the refrigerant introduced via the connection line to the chiller without expansion; and at least one of the third expansion valve and the fourth expansion valve expands the supplied refrigerant such that the expanded refrigerant is supplied to the heat-exchanger.

14. The heat pump system of claim 10, wherein, in the fourth mode:

an operation of the first expansion valve is stopped;

the refrigerant line connecting the heat-exchanger and the fourth expansion valve is closed by an operation of the fourth expansion valve;

the refrigerant line connecting the heat-exchanger and the first expansion valve is closed;

a partial refrigerant line connected to an upstream end and a downstream end of the evaporator is closed;

a partial connection line connecting a first end of the connection line to the second expansion valve is closed;

a remaining connection line connecting a second end of the connection line to the chiller is opened;

the first line is opened by an operation of the third expansion valve;

a partial refrigerant line connecting the third expansion valve and the gas-liquid separator and a partial refrigerant line connecting a second end of the first line and the gas-liquid separator are closed;

the second line is opened by an operation of the second expansion valve;

the supply line is closed;

at least one of the second expansion valve and the third expansion valve expands the supplied refrigerant such that the expanded refrigerant is introduced into the chiller; and the operation of the fourth expansion valve is stopped.

15. The heat pump system of claim 10, wherein, in the fifth mode:

the refrigerant line connecting the heat-exchanger and the evaporator is opened by an operation of the first expansion valve;

the connection line is opened by an operation of the second expansion valve;

the first line is opened by an operation of the third expansion valve;

a partial refrigerant line connecting the third expansion valve and the gas-liquid separator and a partial refrigerant line connecting a second end of the first line and the gas-liquid separator are closed;

the second line is closed by the operation of the second expansion valve;

the supply line is closed;

the first expansion valve expands the supplied refrigerant, and supplies the expanded refrigerant to the evaporator via the refrigerant line;

the second expansion valve expands the refrigerant supplied via the connection line and supplies the expanded refrigerant to the chiller;

the third expansion valve flows the refrigerant supplied via the refrigerant line to the first line without expansion; and the fourth expansion valve supplies the supplied refrigerant to the heat-exchanger without expansion.

16. The heat pump system of claim 1, wherein the chiller is connected to an electrical component via a first coolant line where the coolant circulates and is connected to a battery module via a second coolant line where the coolant circulates.

17. The heat pump system of claim 16, wherein, when recollecting waste heat of the electrical component, the first coolant line is opened to connect the chiller and the electrical component.

18. The heat pump system of claim 16, wherein, when cooling the battery module, or when recollecting waste heat of the battery module, the second coolant line is opened to connect the chiller and the battery module.

19. The heat pump system of claim 1, further comprising an accumulator provided on the refrigerant line between the evaporator and the compressor.

* * * * *